(12) United States Patent
Gong et al.

(10) Patent No.: US 11,144,243 B2
(45) Date of Patent: Oct. 12, 2021

(54) METHOD AND DEVICE FOR MANAGING REDUNDANT ARRAY OF INDEPENDENT DISKS AND COMPUTER PROGRAM PRODUCT

(71) Applicant: EMC IP Holding Company LLC, Hopkinton, MA (US)

(72) Inventors: Shaoqin Gong, Beijing (CN); Jibing Dong, Beijing (CN); Geng Han, Beijing (CN); Jianbin Kang, Beijing (CN); Hongpo Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 112 days.

(21) Appl. No.: 16/579,990

(22) Filed: Sep. 24, 2019

(65) Prior Publication Data
US 2020/0133576 A1   Apr. 30, 2020

(30) Foreign Application Priority Data
Oct. 31, 2018   (CN) .......................... 201811286810.2

(51) Int. Cl.
*G06F 3/06* (2006.01)
*G06F 16/22* (2019.01)

(52) U.S. Cl.
CPC .......... *G06F 3/0659* (2013.01); *G06F 3/0604* (2013.01); *G06F 3/0689* (2013.01); *G06F 16/2237* (2019.01); *G06F 16/2272* (2019.01)

(58) Field of Classification Search
CPC .... G06F 3/0604; G06F 3/0607; G06F 3/0629; G06F 3/0644; G06F 3/0659; G06F 3/0689
See application file for complete search history.

(56) References Cited

U.S. PATENT DOCUMENTS 10,430,279 B1 * 10/2019 Dittia .................... G06F 3/0689

* cited by examiner

*Primary Examiner* — Aracelis Ruiz
(74) *Attorney, Agent, or Firm* — BainwoodHuang

(57) ABSTRACT

Techniques manage a redundant array of independent disks. The techniques involve: in response to receiving a first command for assigning a first RAID stripe to a RAID group, storing metadata information of the first RAID stripe in a cache, the cache having different input/output (I/O) performance from the RAID; and storing the first command and the metadata information of the first RAID stripe in a predetermined storage space of the RAID in a sequential storage structure.

27 Claims, 6 Drawing Sheets

METHOD AND DEVICE FOR MANAGING REDUNDANT ARRAY OF INDEPENDENT DISKS AND COMPUTER PROGRAM PRODUCT

CROSS-REFERENCE TO RELATED APPLICATION(S)

This application claims priority to Chinese Patent Application No. CN201811286810.2, on file at the China National Intellectual Property Administration (CNIPA), having a filing date of Oct. 31, 2018, and having "METHOD AND DEVICE FOR MANAGING REDUNDANT ARRAY OF INDEPENDENT DISKS AND COMPUTER PROGRAM PRODUCT" as a title, the contents and teachings of which are herein incorporated by reference in their entirety.

FIELD

Embodiments of the present disclosure generally relate to the field of data storage, and more specifically to a method and device for managing a redundant array of independent disks and a computer program product.

BACKGROUND

A data storage system usually has multiple storage disks. The multiple storage disks may be organized in a disk array. For example, a Redundant Array of Independent Disks (RAID) is a data storage virtualization technology that organizes the multiple storage disks into a single logical unit for purpose of data redundancy backup and/or performance improvement. Each storage disk may be divided into a plurality of drive extents. For example, at least a portion of the plurality of disk extents is organized into a disk array by a storage processor. Depending on the level of required redundancy and performance, it may have different types, such as RAID 1, RAID 2, ..., RAID 5, RAID 6, and the like. Taking RAID 5 as an example, each RAID stripe may include five drive extents distributed on different physical storage disks. In addition, in order to provide a logical storage space for the user, a plurality of RAID stripes may be organized into a RAID group, and metadata information of the RAID stripes in the RAID group is stored in the data storage system.

When the space of a RAID group needs to be expanded, a new RAID stripe may be assigned to the RAID group. In this case, the metadata information of the new RAID stripe needs to be stored in the data storage system. In another case, when all data in a certain RAID stripe is invalid, the RAID stripe needs to be released from the RAID group. Therefore, it is necessary to delete the metadata information of the RAID stripe from the data storage system. In some other cases, it may also be desirable to update metadata information stored in the data storage system, for example when one or more storage disks are removed from the storage system or inserted back to the storage system.

When the metadata information of the RAID stripe is updated, it is necessary to ensure the accuracy of the updated information, which is critical to the performance of the data storage system. In addition, the read speed of the metadata information of the RAID stripe also has a large impact on the input and output (I/O) performance of the storage system. Therefore, it is desirable to provide an improved solution to improve the update accuracy and read speed of metadata information of the RAID stripe.

SUMMARY

In general, embodiments of the present disclosure provide a method and device for managing a redundant array of independent disks (RAID), and a computer readable medium.

According to a first aspect of the present disclosure, there is provided a method for managing a redundant array of independent disks (RAID), including: in response to receiving a first command for assigning a first RAID stripe to a RAID group, storing metadata information of the first RAID stripe in a cache, the cache having different input/output (I/O) performance from the RAID; and storing the first command and the metadata information of the first RAID stripe in a predetermined storage space of the RAID in a sequential storage structure.

According to a second aspect of the present disclosure, there is provided a device for managing a redundant array of independent disks (RAID, including: at least a processing unit; at least one memory coupled to the at least one processing unit and storing instructions to be executed by the at least one processing unit, the instructions, when executed by the at least one processing unit, causing the device to perform actions including: in response to receiving a first command for assigning a first RAID stripe to a RAID group, storing metadata information of the first RAID stripe in a cache, the cache having different input/output (I/O) performance from the RAID; and storing the first command and the metadata information of the first RAID stripe in a predetermined storage space of the RAID in a sequential storage structure.

According to a third aspect of the present disclosure, there is provided a computer program product that is tangibly stored on a non-transitory computer readable medium and includes machine-executable instructions, wherein the machine-executable instructions are used to execute the method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings. In the figures, several embodiments of the present disclosure are illustrated by way of example but non-restrictively. In the figures.

In the drawings, the same and corresponding reference numbers represent the same or corresponding parts.

DETAILED DESCRIPTION OF EMBODIMENTS

Figure 1:
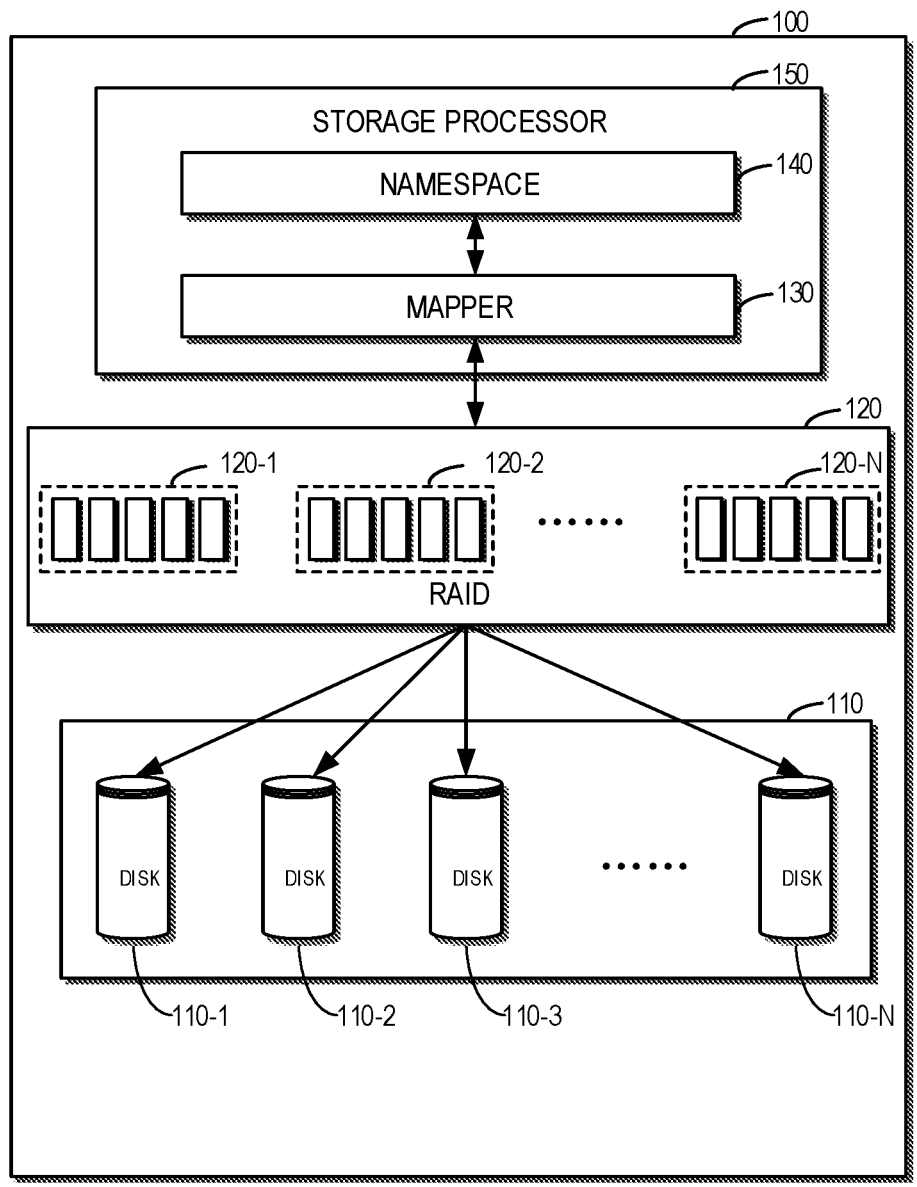
FIG. 1 illustrates an architectural diagram of a storage system according to an embodiment of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

FIG. 1 illustrates an architectural diagram of a storage system 100 according to an embodiment of the present disclosure. As shown in FIG. 1, the storage system 100 may include a storage disk 110 and a storage processor 150. It should be appreciated that the structure and function of the storage system 100 as shown in FIG. 1 is for illustrative purposes only and does not imply any limitation to the scope of the present disclosure. Embodiments of the present disclosure may be embodied in different structures and/or functions.

As shown in FIG. 1, the storage disk 110 includes a plurality of storage disks 110-1, 110-2, . . . , 110-N (where N is a positive integer). The "storage disk" as used herein may refer to any currently-known or future-developed non-volatile storage medium, such as a magnetic disk, optical disk, or solid state disk (SSD). In the description herein, the solid state disk will be taken as an example of the storage disk, and each solid state disk for example may have a size of for example, 400 GB, 800 GB, 1 TB, 2 TB, 32 TB, or the like. However, it should be understood that this is only intended to facilitate description and is not intended to limit the scope of the disclosure.

Each of the storage disks 110 may be divided into a plurality of drive extents. It should be appreciated that the size of the drive extent may be determined according to needs. For example, the size of the drive extent may be set to the order of GB (for example, one drive extent is set to 4 GB). The storage processor 150 may organize at least a portion of the plurality of drive extents into a disk array 120. The disk array 120 for example may be a Redundant Array of Independent Disks (RAID), which usually combines multiple physical storage units into a logical storage unit for the purpose of data redundancy backup and/or performance improvement. Depending on the level of the required redundancy and performance, it may have different types, such as RAID 1, RAID 2, . . . , RAID 5, RAID 6, and the like.

The disk array 120 may include a plurality of strips 120-1, 120-2, . . . , 120-N (where N is a positive integer). Each stripe may include a data drive extent for storing user data and a parity drive extent for storing parity information. Take RAID 5 with a 4D+1P layout as an example, wherein each stripe may include 4 data drive extents (namely, "4D") and 1 parity drive extent (namely, "1P"). In the following description, RAID 5 of 4D+1P will be taken as an example of the disk array 120. However, it should be appreciated that this is only for the purpose of illustration and does not imply any limitation of the scope of the present disclosure. Embodiments of the present disclosure may be applied to RAIDs having other layouts or other types.

The storage processor 150 may include a mapper 130 and a namespace 140. The mapper 130 is used to provide a mapping relationship between a physical storage location occupied by the RAID 120 and a logical location used by the namespace 140. The namespace 140 implements a mapping from the logical location to the physical location by calling the API of the mapper 130.

When a user of the storage system 100 writes data or reads data, the user sends an instruction to the namespace 140 to write data or read data. The namespace 140 processes the instruction and then send it to the mapper 130. The mapper 130 utilizes internal mapping relationships to look up a location where the data should be written or read, and sends the location to the RAID 120. The RAID 120 utilizes this location to handle the user's instruction to write data or read data.

Figure 2:
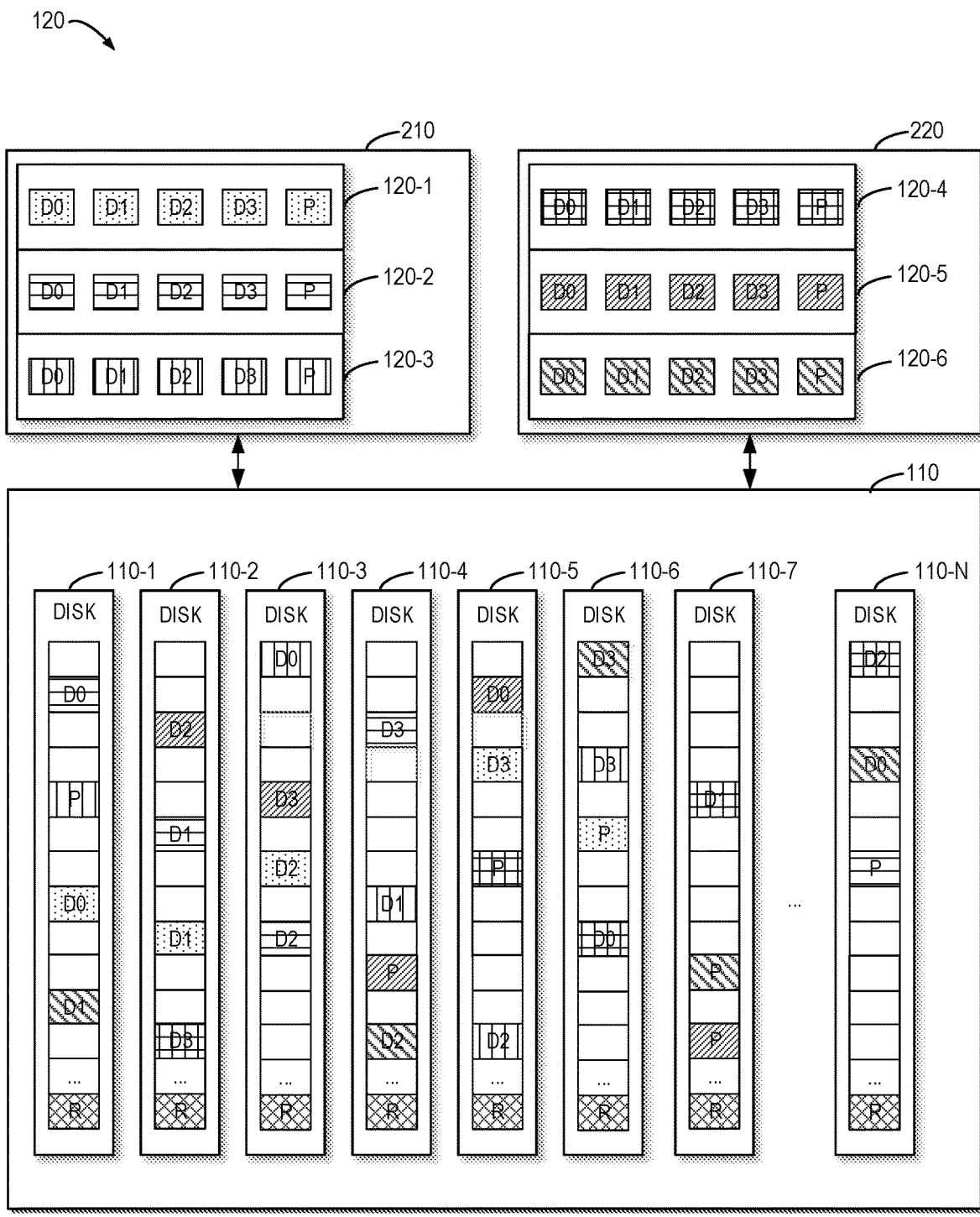
FIG. 2 illustrates a schematic diagram of an example layout of a RAID according to an embodiment of the present disclosure.

FIG. 2 illustrates a schematic diagram of an example mapped RAID 120 according to an embodiment of the present disclosure. The figure shows an example of the mapped RAID built on the multiple disks 110 as shown in FIG. 1. As shown in FIG. 2, for example, a RAID 5 having a 4D+1P layout is built on N disks 110-1~110-N, wherein N is greater than 5. In the example shown in FIG. 2, D0 to D3 respectively represent data drive extents for storing user data, and P represents a parity drive extent for storing parity information. When a RAID stripe (which includes D0~D3 and P) is created, 5 drive extents may be randomly selected from 5 different disks. Therefore, the user data and parity information will be evenly distributed to all disks. For example, in the example of FIG. 2, a RAID group 210 and a RAID group 220 are created on the disk 110 to provide a logical storage space for the user. The RAID group 210 may include RAID strips 120-1, 120-2, and 120-3, while RAID group 220 may include RAID strips 120-4, 120-5, and 120-6. In addition, in order to ensure the reliability of the mapped RAID, some backup drive extents may be reserved on the disk 110, for example, represented by R. When a certain disk in the disk 110 fails, these backup drive extents may be used to rebuild a RAID stripe associated with the failure, thereby avoiding the occurrence of data loss.

In some embodiments, the I/O request for the storage device may be an I/O request for a certain RAID stripe as shown in FIG. 2 (e.g., RAID strips 120-1, 120-2, 120-3, 120-4, 120-5 or 120-6). For example, the storage processor 150 may maintain a mapping relationship between the RAID stripe and the disk 110, and may determine one or more disks 110 involved in the I/O request based on the mapping relationship. Taking RAID stripe 120-1 as an example, the request for RAID stripe 120-1 will involve disks 110-1, 110-2, 110-3, 110-5, and 110-6. Taking RAID stripe 120-4 as an example, the request for the RAID stripe 120-4 will involve disks 110-6, 110-7, 110-N, 110-2, and 110-5.

In RAID 120, there may be multiple RAID groups (such as RAID group 210 and RAID group 220) to provide different functions. In one embodiment, the RAID group 210 may be used to store user data, and RAID group 220 is used to store metadata for the user data. In other embodiments, RAID group 210 and RAID group 220 may also be used to store other types of data. In addition, there might further exist RAID groups having other functions in the RAID 120, and their organization manners may be the same as or different from those of the RAID group 210 and the RAID group 220, and will not be detailed again here.

It is also necessary to store metadata information of RAID stripes (e.g., RAID stripes 120-1, 120-2, 120-3, 120-4, 120-5, or 120-6) in the RAID 120. For example, the metadata information of RAID strips 120-1, 120-2, 120-3, 120-4, 120-5, and 120-6 may be stored in a storage space consisting of one or more other RAID strips. In one embodiment, the metadata information of each RAID stripe may be 128 bytes in size. In other embodiments, the metadata information of each RAID stripe may have other sizes, such as 64 bytes, 32 bytes, etc., and the scope of the present disclosure is not limited in this respect.

When a state of the RAID stripe included in the RAID 120 changes, it is necessary to update the metadata information of the RAID stripe stored in the above storage space. In the following text are listed several example cases in which metadata information of the RAID stripe needs to be updated.

Figure 3:
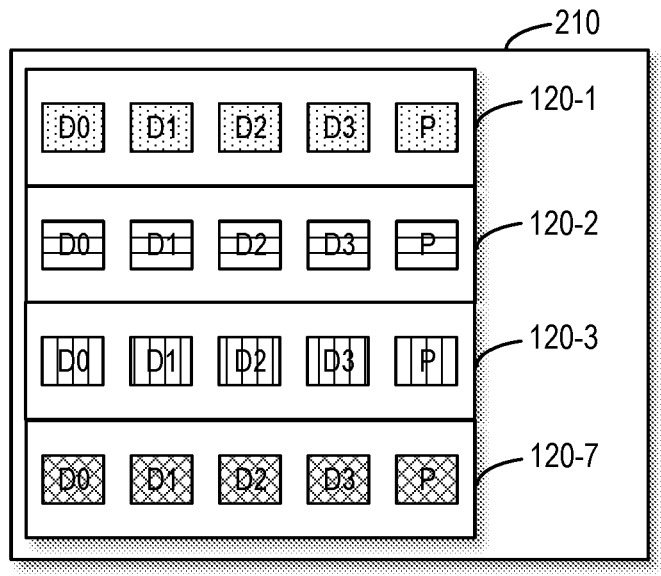
FIG. 3 illustrates a schematic diagram of a RAID group in which a new RAID stripe is allocated according to an embodiment of the present disclosure.

In some embodiments, when the space of a RAID group (e.g., RAID group 210 or RAID group 220) needs to be expanded, a new RAID stripe may be assigned to the RAID group. For example, when the space of the RAID group 210 needs to be expanded, a new RAID stripe 120-7 may be assigned to the RAID group 210, as shown in FIG. 3. The RAID stripe 120-7 is organized in a manner similar to the RAID strips 120-1, 120-2, 120-3. In this way, the expanded RAID group 210 may be obtained. In this case, the metadata information of the new RAID stripe 120-7 needs to be updated into the storage system 100. In other embodiments, more new RAID stripes may be assigned to the RAID group 210. Accordingly, metadata information of these new RAID stripes also needs to be updated into the storage system 100.

In addition, the RAID group 220 may be expanded in a similar manner, and details are not described herein again.

In some embodiments, when the data in a certain RAID stripe has all become invalid, the mapper 130 shown in FIG. 1 may be used to release the RAID stripe from the RAID group. For example, when all of the data in the RAID stripe 120-3 in the RAID group 210 becomes invalid, the mapper 130 may be used to release the RAID stripe 120-3 from the RAID group 210. In this case, the metadata information of the RAID stripe 120-3 needs to be deleted from the storage system 100.

In some embodiments, when one or more storage disks (e.g., disks 110-1 and 110-2) are removed from storage system 100 or inserted back to the storage system 100, it is also necessary to update metadata information of the RAID stripe associated with these storage disks.

When updating the metadata information of a RAID stripe, it is necessary to ensure the accuracy of the updated information, which is critical to the performance of the storage system 100. In addition, the read speed of the metadata information of the RAID stripe also has a large impact on the input and output (I/O) performance of the storage system 100. Accordingly, embodiments of the present disclosure provide an improved solution to improve the update accuracy and read speed of metadata information of the RAID stripe.

Figure 4:
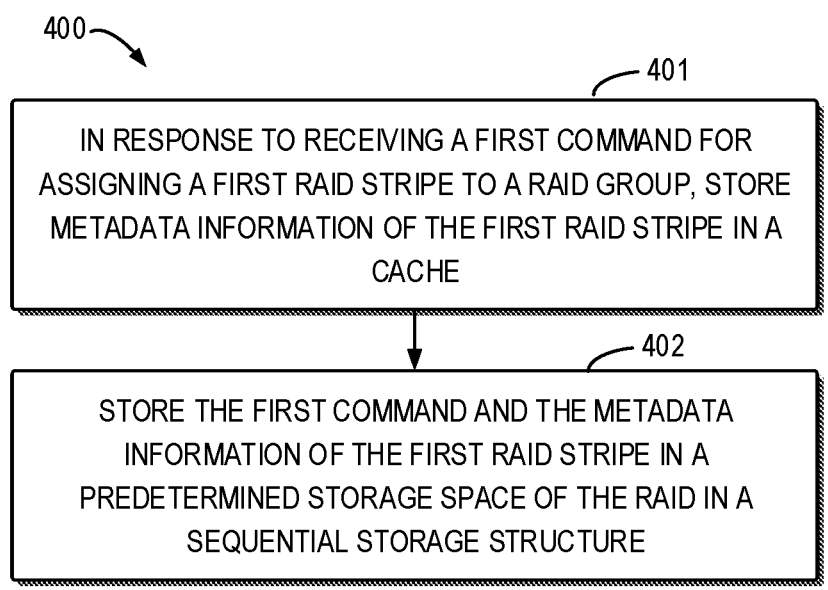
FIG. 4 illustrates a flow chart of a method according to an embodiment of the present disclosure.

FIG. 4 illustrates a flow diagram of a method 400 for managing an RAID 120 according to an embodiment of the present disclosure. The method 400 for example may be performed by the storage processor 150 as shown in FIG. 1. It should be appreciated that the method 400 may also include additional actions not shown and/or the illustrated actions may be omitted, and the scope of the present disclosure is not limited in this respect.

Figure 5:
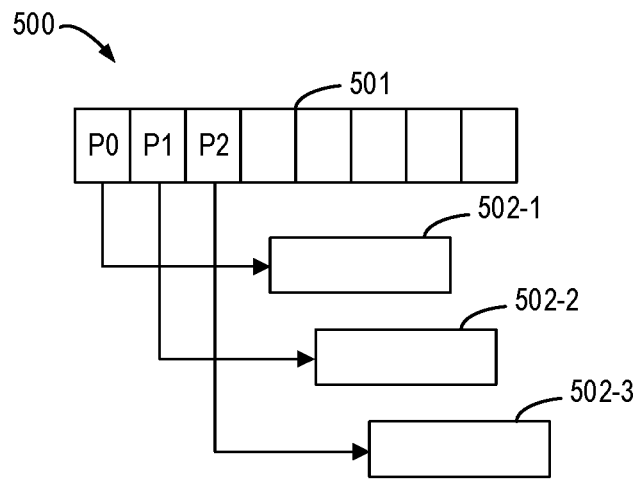
FIG. 5 illustrates a structural block diagram of a cache according to an embodiment of the present disclosure.

At block 401, metadata information of a first RAID stripe is stored in a cache in response to receiving a first command for assigning the first RAID stripe to a RAID group. The cache has different input/output (I/O) performance than the RAID. For example, the I/O performance of the cache may be better than the RAID. For example, the cache may be implemented by a dynamic random access memory (DRAM). As described above with reference to FIG. 3, when the space of the RAID group 210 needs to be expanded, a new RAID stripe 120-7 may be assigned to the RAID group 210. In this case, the metadata information of the RAID stripe 120-7 may be stored in the cache in response to the first command for assigning the RAID stripe 120-7 to the RAID group 210. FIG. 5 illustrates a block diagram of a structure of a cache 500 in accordance with an embodiment of the present disclosure. An example process of storing metadata information of the RAID stripe 120-7 in the cache 500 will be described hereinafter with reference to FIG. 5.

In some embodiments, as shown in FIG. 5, the cache 500 includes a first index array 501 and a plurality of data arrays 502-1, 502-2, 502-3. The first index array 501 stores pointers P0, P1, P2 that point to the corresponding data arrays 502-1, 502-2, 502-3. The pointers P0, P1, P2 may be stored at the first three storage locations in the first index array 501, and the remaining storage locations in the first index array 501 are not yet occupied. When a new data array 502 is created in the cache 500, the corresponding pointer may be written to a location in the first index array 501 that is not yet occupied. The various data arrays 502-1, 502-2, 502-3 are used to store metadata information of RAID stripes in a RAID group (e.g., RAID group 210 or RAID group 220). Only three data arrays 502-1, 502-2, 502-3 are shown in FIG. 5 as an example to describe the principles of the present disclosure. However, it should be understood that cache 500 may include one or more additional data arrays.

In some embodiments, the metadata information of the RAID stripes may be stored in the form of entries in a table created by the respective data arrays 502-1, 502-2, 502-3. In the cache 500, one or more tables may be created. For a given table, the size of the entries stored therein is fixed. For different tables, the size of the stored entries may be different.

In some embodiments, each data array 502-1, 502-2, 502-3 may have a 4 KB space. In this case, if the metadata information of each RAID stripe has a size of 128 bytes, metadata information of 32 RAID stripes may be stored in each of the data arrays 502-1, 502-2, 502-3. In this way, it is possible to store the metadata information of the first 32 RAID stripes in the RAID 120 in the data array 502-1 according to the index NX of the RAID stripe, and then store metadata information of next 32 RAID strips in data array 502-2, and so on. In other embodiments, each of the data arrays 502-1, 502-2, 502-3 may have a storage space in other sizes, and the scope of the present disclosure is not limited in this respect.

With the above configuration, the storage location of the metadata information of the RAID stripe in the data array 502 may be determined according to the index NX of the RAID stripe. Specifically, assuming that each data array 502 may store metadata information of M (e.g., 32) RAID stripes, it is possible to determine a storage location of a pointer pointing to the data array 502 containing the corresponding metadata information by dividing the index NX by M. Subsequently, the offset of the corresponding metadata information in the data array 502 may be obtained by the index NX modulo M. In this manner, the storage location of the metadata information of the RAID stripe having index NX in the data array 502 can be obtained. For example, assuming that each data array 502 may store metadata information of 32 RAID stripes and the index of the RAID stripe 120-1 is NX=3, a quotient of dividing NX=3 by 32 is zero, which means the pointer pointing to the data array 502 containing the metadata information of the RAID stripe 120-1 is stored at the first positon of the first index array 501. The pointer P0 at the first position in the first index array 501 points to the data array 502-1. Subsequently, a result of the index NX=3 modulo 32 is 3, which means that the metadata information of the RAID stripe 120-1 is stored at the third position in the data array 502-1.

In some embodiments, when the RAID stripe 120-7 is assigned to the RAID group 210, a first data array, for example, the data array 502-2, for storing the metadata information of the RAID stripe 120-7 already exists in the cache 500. In this case, the metadata information of the RAID stripe 120-7 may be directly stored in the data array 502-2. In other embodiments, when the RAID stripe 120-7 is assigned to the RAID group 210, there is no first data array for storing metadata information of the RAID strips 120-7 in the cache 500. In this case, it is necessary to first create a new first data array in the cache 500 and add a pointer pointing to the first data array in the first index array 501. The metadata information of the RAID strips 120-7 may then be written to the created first data array. When the new first data array is created, entries in the storage space except for the storage space for storing metadata information of the RAID stripe 120-7 in the first data array may be marked as a released state for writing metadata information of other RAID stripes therein.

As more and more RAID stripes are allocated, the first index array 501 might be filled up. In this case, it is necessary to allocate a new larger space for the first index array 501. Accordingly, in response to the first index array 501 being filled up, a second index array having a larger storage space may be allocated in the cache 500. Subsequently, the pointers stored in the first index array 501 may be copied into the second index array and the first index array 501 is then released. In this way, more entries may continue to be allocated in order to store metadata information of more RAID stripes.

In some cases, it is necessary to read the stored metadata information from the cache 500. To this end, the metadata information of a second RAID stripe may be read from a corresponding data array of the plurality of data arrays in response to a second command for reading the metadata information of the second RAID stripe in the RAID group. The second command includes an index NX of the second RAID stripe. When the metadata information is read, the storage location of the metadata information of the RAID stripe in the data array 502 may be determined according to the methods described above. For example, a pointer pointing to the second data array may be selected from the first index array 501 based on the index NX of the second RAID stripe. The metadata information of the second RAID stripe is already stored in the second data array. Subsequently, the storage location of the metadata information of the second RAID stripe in the second data array may be determined based on the index of the second RAID stripe and the pointer pointing to the second data array. Finally, the metadata information of the second RAID stripe may be read from the second data array based on the storage location. In this way, the metadata information of the RAID stripe may be read from the cache 500 at a higher speed. The second RAID stripe may be any of the RAID strips 120-1, 120-2, 120-3, 120-4, 120-5, 120-6, and 120-7 described above.

As described above, when all of the data in a certain RAID stripe becomes invalid, this RAID stripe may be released from the RAID group. To this end, the storage location for storing the metadata information of the third RAID stripe in the third data array may be marked as a released state in response to a third command for releasing the third RAID stripe from the RAID group, wherein the metadata information of the third RAID stripe is already stored in the third data array. The third RAID stripe may be any of the RAID strips 120-1, 120-2, 120-3, 120-4, 120-5, 120-6, and 120-7 described above.

Figure 6:
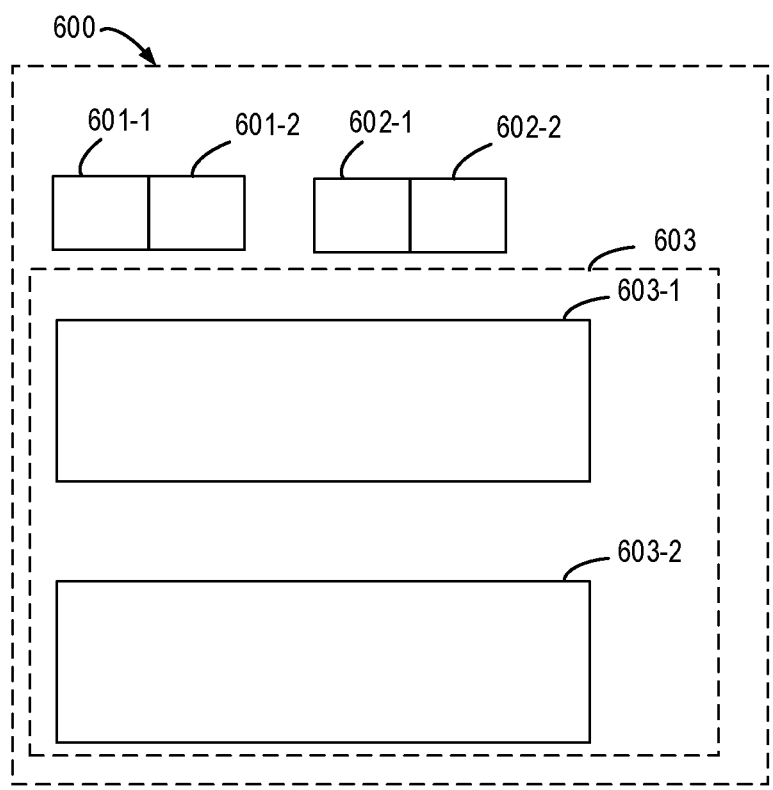
FIG. 6 illustrates a structural block diagram of a predetermined storage space according to an embodiment of the present disclosure.

Further referring to FIG. 4, at block 402, the first command and the metadata information of the first RAID stripe are stored in a predetermined storage space of the RAID in a sequential storage structure in response to receiving the first command for assigning the first RAID stripe to a RAID group. As described above with reference to FIG. 3, when the space of the RAID group 210 needs to be expanded, a new RAID stripe 120-7 may be assigned to the RAID group 210. In this case, it is possible to store the first command and the metadata information of the RAID stripe 120-7 in the predetermined storage space of the RAID 120 in response to the first command for assigning the RAID stripe 120-7 to the RAID group 210. FIG. 6 shows a structural block diagram of a predetermined storage space 600 in accordance with an embodiment of the present disclosure. An example process of storing the first command and the metadata information of the RAID stripe 120-7 in the predetermined storage space 600 will be described hereinafter with reference to FIG. 6.

In some embodiments, as shown in FIG. 6, the predetermined storage space 600 includes a data storage region 603 and a first super section 601-1 and a second super section 601-2. The data storage region 603 is used to store metadata information of RAID stripes in a RAID group (e.g., RAID group 210 or RAID group 220) and commands associated with metadata information of the RAID stripes. The first super section 601-1 and the second super section 601-2 are both used to store head and tail addresses of the storage space already occupied in the data storage region 603, wherein one of the first super section 601-1 and the second super section 601-2 is marked as a currently active super section, and in the other of the first super section 601-1 and the second super section 601-2 is marked as a to-be-updated super section.

In some embodiments, the first super section 601-1 and the second super section 601-2 have corresponding transaction numbers. The transaction number may be used to indicate which super section of the first super section 601-1 and the second super section 601-2 is the currently active super section and which super section is the to-be-updated super section. As an example, a super section with a larger transaction number of the first super section 601-1 and the second super section 601-2 may be designated as the currently active super section, and the super section with a smaller transaction number is designated as the to-be-updated super section. After the updated information (for example, the first command and the metadata information of the RAID stripe 120-7) is written into the data storage region 603, the head and tail addresses stored in the to-be-updated super section having a smaller transaction number are updated, and the transaction number of the to-be-updated super section is increased to make it become larger than the transaction number of the currently active super section. In this case, the original to-be-updated super section becomes the new currently active super section, and the original currently active super section becomes the new to-be-updated super section for the next update. That is, after the updated information is written into the data storage region 603 each time, roles of the first super section 601-1 and the second super section 601-2 are interchanged, that is, the first super section 601 and the second super sections 601-2 are updated in turn and are used in turn as the currently active super section and the to-be-updated super section.

Figure 7A:
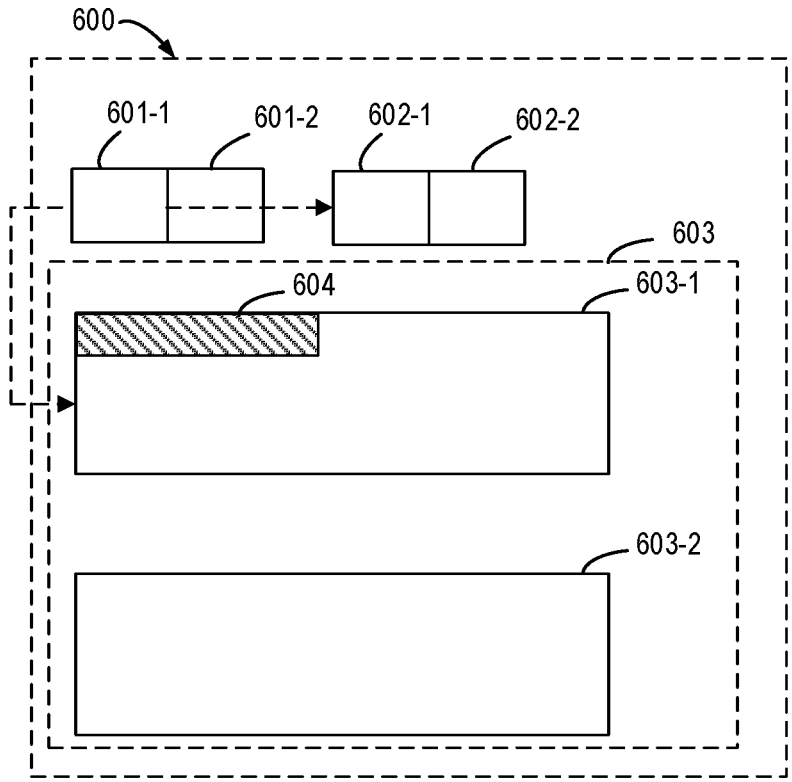
FIG. 7A and FIG. 7B illustrate states of a predetermined storage space before and after an update, respectively, according to an embodiment of the present disclosure.
Figure 7B:
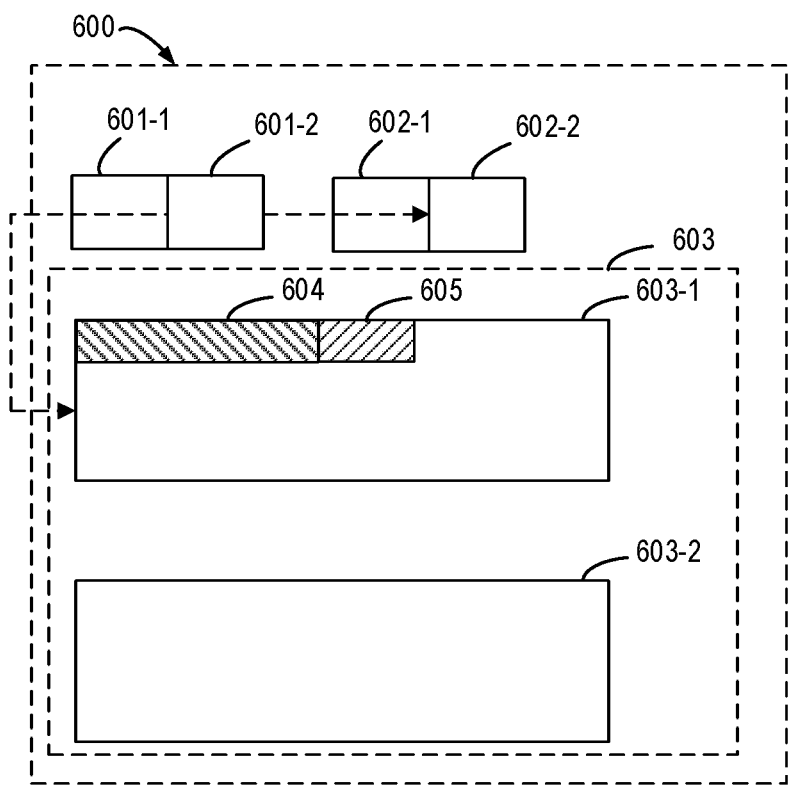

FIG. 7A and FIG. 7B illustrate states of the predetermined storage space 600 before and after an update, respectively, according to an embodiment of the present disclosure. As shown in FIG. 7A, before the update of the predetermined storage space 600, the first super section 601-1 is the currently active super section with the larger transaction number, and the second super section 601-2 is the to-be-updated super section with the smaller transaction number. In this case, the head and tail addresses stored in the first super section 601-1 are valid, and the head and tail addresses stored in the second super section 601-2 are old.

As shown in FIG. 7B, after the update of the predetermined storage space 600, the head and tail addresses of the storage space that have been occupied by the previous data 604 and the updated data 605 in the data storage region 603 are updated to the second super section 601-2. At this time, the transaction number of the second super section 601-2 becomes larger than the transaction number of the first super section 601-1. Therefore, the first super section 601-1 becomes the to-be-updated super section with the smaller transaction number, and the second super section 601-2 becomes the currently active super section with the larger transaction number. In this case, the head and tail addresses stored in the second super section 601-2 are valid, and the head and tail addresses stored in the first super section 601-1 are old. Accordingly, when the next update is made, the updated head and tail addresses are again written into the first super section 601-1, and the first super section 601-1 is marked as the currently active super section.

With the first super section 601-1 and the second super section 601-2, it may be guaranteed that the update process is atomic, that is, without touching the previous data, the update succeeds or any update fails. This improves the update accuracy of the metadata information of the RAID stripe.

In some embodiments, as shown in FIG. 6, the predetermined storage space 600 further includes a first intermediate section 602-1 associated with the first super section 601-1 and a second intermediate section 602-2 associated with the second super section 601-2. The first intermediate section 602-1 and the second intermediate section 602-2 are respectively used to temporarily store information to be written into the data storage region 603. With this configuration, the first command and the metadata information of the first RAID stripe may be temporarily stored in one of the first intermediate section 602-1 and the second intermediate section 602-2 corresponding to the to-be-updated super section, and then the information stored in the first intermediate section 602-1 or the second intermediate section 602-2 is written to the data storage region 603 in response to the first intermediate section 602-1 or second intermediate region 602-2 being filled up. In this way, the usage rate of the space in the data storage region 603 is increased.

In some embodiments, as shown in FIG. 6, the data storage region 603 includes a first data storage region 603-1 and a second data storage region 603-2. In the first data storage region 603-1 and the second data storage region 603-2, the updated information is stored in the sequential storage structure. For example, as shown in FIG. 7B, the updated data 605 is sequentially stored in the first data storage region 603-1 immediately following the previous data 604. In this way, log input and output may be avoided when the metadata information is updated, thereby increasing the update speed of the storage disk. In other embodiments, the data storage region 603 may include a single storage region or a plurality of storage regions that store information in the sequential storage structure. The scope of the present disclosure is not limited in this respect.

In some embodiments, it is possible to, in response to the occupied storage space in the currently active storage region of the first storage region 603-1 and the second storage region 603-2 reaching a predetermined threshold, store the metadata information of the RAID stripe in the RAID group and the associated command stored in the cache 500 shown in FIG. 5 into the other storage region of the first storage region 603-1 and the second storage region 603-2, and release the currently valid storage region. Referring to FIGS. 7A and 7B, the first memory area 603-1 is the currently active storage region. During the update process, the updated information is continuously stored in the first storage region 603-1, which causes the storage space occupied in the first storage region 603-1 to become larger and larger. In a case where the space usage rate of the first storage region 603-1 reaches a predetermined threshold, the metadata information of the RAID stripe in the RAID group and the associated command stored in the cache 500 may be stored in the second storage region 603-2, and the first storage region 603-1 is then released. In this way, data redundancy in the first storage region 603-1 and the second storage region 603-2 can be removed, and only the latest data is contained, thereby saving space and improving performance.

As described above, when all of the data in a certain RAID stripe becomes invalid, this RAID stripe may be released from the RAID group. To this end, a third command may be appended to the data storage region in response to a third command for releasing the third RAID stripe from the RAID group. The third RAID stripe may be any of the RAID strips 120-1, 120-2, 120-3, 120-4, 120-5, 120-6, and 120-7 described above.

With the above configuration, in a booting process of the storage system 100 as shown in FIG. 1, it is possible to first write the metadata information stored in the currently active storage region, to which the currently active super section of the first super section 601-1 and second super section 601-2 points, into the cache 500.

Figure 8:
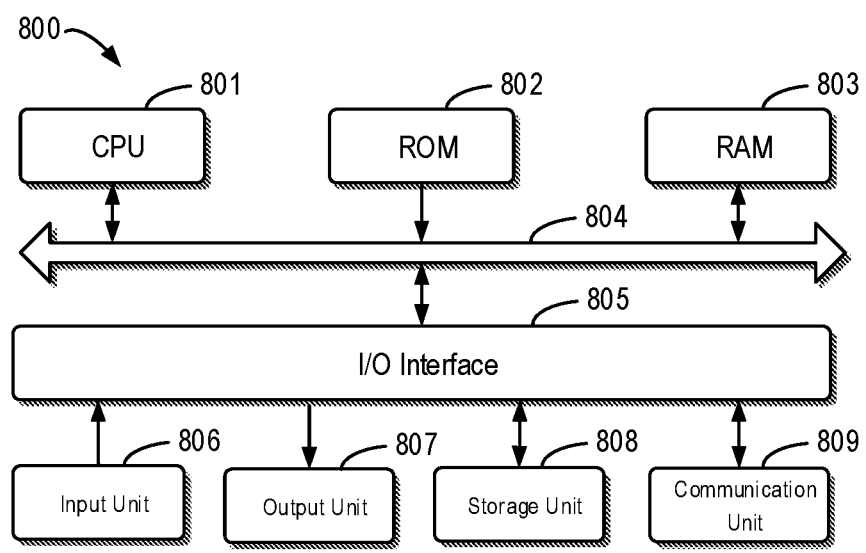
FIG. 8 illustrates a schematic block diagram of an example device that can be used to implement embodiments of the present disclosure.

FIG. 8 illustrates a block diagram of an example device 800 adapted to implement the embodiments of the present disclosure. As shown in the figure, a portion of the storage system 100 shown in FIG. 1 may be implemented by the device 800. As shown in FIG. 8, the device 800 includes a central processing unit (CPU) 801 that may perform various appropriate actions and processing based on computer program instructions stored in a read-only memory (ROM) 802 or computer program instructions loaded from a memory unit 808 to a random access memory (RAM) 803. In the RAM 803, various programs and data needed for operations of the device 800 may also be stored. The CPU 801, ROM 802 and RAM 803 are connected to each other via a bus 804. An input/output (I/O) interface 805 is also connected to the bus 804.

Various components in the device 800 are connected to the I/O interface 805, including: an input unit 806 such as a keyboard, a mouse and the like; an output unit 807 such as various kinds of displays and a loudspeaker, etc.; a storage unit 808 such as a magnetic disk, an optical disk, and etc.; a communication unit 809 such as a network card, a modem, and a wireless communication transceiver, etc. The communication unit 809 allows the device 800 to exchange information/data with other devices through a computer network such as the Internet and/or various kinds of telecommunications networks.

Various processes and processing described above, e.g., method 400, may be executed by the processing unit 801. For example, in some embodiments, the method 400 may be implemented as a computer software program that is tangibly embodied on a machine readable medium, e.g., the storage unit 808. In some embodiments, part or all of the computer program may be loaded and/or mounted onto the device 800 via ROM 802 and/or communication unit 809. When the computer program is loaded to the RANI 803 and executed by the CPU 801, one or more steps of the method 400 as described above may be executed.

Embodiments of the present disclosure relate to a method, device, system and/or computer program product. The computer program product may include a computer readable storage medium on which computer readable program instructions for executing various aspects of the present disclosure are embodied.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus, such that the instructions, which execute via the processor of the computer or other programmable data processing apparatus, create means (or specialized circuitry) for implementing the functions/actions specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/actions specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, section, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or actions, or combinations of special purpose hardware and computer instructions.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for managing a redundant array of independent disks (RAID), comprising:
   in response to receiving a first command for assigning a first RAID stripe to a RAID group, storing metadata information of the first RAID stripe in a cache, the cache having different input/output (I/O) performance from the RAID; and
   storing the first command and the metadata information of the first RAID stripe in a predetermined storage space of the RAID in a sequential storage structure.

2. The method according to claim 1, wherein the cache comprises a first index array configured to store pointers for pointing to a plurality of data arrays and a plurality of data arrays configured to store metadata information of RAID stripes in the RAID group.

3. The method according to claim 2, wherein storing the metadata information of the first RAID stripe in the cache comprises:
   in response to a first data array for storing the metadata information of the first RAID stripe being present in the cache, storing the metadata information of the first RAID stripe in the first data array; and
   in response to the first data array being absent in the cache, creating the first data array in the cache and adding in the first index array a pointer for pointing to the first data array, and writing the metadata information of the first RAID stripe into the first data array.

4. The method according to claim 3, further comprising:
   in response to the first index array being filled up, allocating a second index array in the cache, wherein a storage space of the second index array is larger than that of the first index array;
   copying the pointers stored in the first index array into the second index array; and
   releasing the first index array.

5. The method according to claim 2, further comprising:
   in response to a second command for reading metadata information of a second RAID stripe in the RAID group, reading the metadata information of the second RAID stripe from a respective data array of the plurality of data arrays, wherein the second command comprises an index of the second RAID stripe.

6. The method according to claim 5, wherein reading the metadata information of the second RAID stripe from the respective data array of the plurality of data arrays comprises:
   selecting a pointer pointing to a second data array from the first index array based on the index of the second RAID stripe, wherein the metadata information of the second RAID stripe is already stored in the second data array;
   determining a storage location of the metadata information of the second RAID stripe in the second data array based on the index of the second RAID stripe and the pointer pointing to the second data array; and
   reading the metadata information of the second RAID stripe from the second data array based on the storage location.

7. The method according to claim 2, further comprising:
   in response to a third command for releasing a third RAID stripe from the RAID group, marking a storage location in a third data array configured to store metadata information of the third RAID stripe as a released state, wherein the metadata information of the third RAID stripe is already stored in the third data array.

8. The method according to claim 1, wherein the predetermined storage space comprises:
   a data storage region configured to store metadata information of RAID stripes in the RAID group and commands associated with the metadata information of the RAID stripes; and
   a first super section and a second super section, each configured to store head and tail addresses of a storage space already occupied in the data storage region, wherein one of the first super section and the second super section is marked as a currently active super section, and the other of the first super section and the second super section is marked as a to-be-updated super section.

9. The method according to claim 8, further comprising:
updating the head and tail addresses in the to-be-updated super section after storing the first command and the metadata information of the first RAID stripe in the predetermined storage space; and
marking the to-be-updated super-section as a new currently active super section, and marking the currently active super section as a new to-be-updated super section for next update.

10. The method according to claim 8, wherein the predetermined storage space further comprises a first intermediate section associated with the first super section and a second intermediate section associated with the second super section, and the first intermediate section and the second intermediate section are each configured to temporarily store information to be written into the data storage region.

11. The method according to claim 10, wherein storing the first command and the metadata information of the first RAID stripe in the predetermined storage space in the sequential storage structure comprises:
temporarily storing the first command and the metadata information of the first RAID stripe in an intermediate section of the first intermediate section and the second intermediate section corresponding to the to-be-updated super section; and
in response to the first intermediate section or the second intermediate section being filled up, writing information stored in the first intermediate section or the second intermediate section into the data storage region.

12. The method according to claim 8, further comprising:
in response to a third command for releasing a third RAID stripe from the RAID group, appending the third command into the data storage region.

13. The method according to claim 8, wherein the data storage region comprises a first data storage region and a second data storage region, the method further comprising:
in response to the occupied storage space in one storage region of the first storage region and the second storage region reaching a predetermined threshold, storing, in another storage region of the first storage region and the second storage region, the metadata information of the RAID stripes in the RAID group and the associated commands stored in the cache; and
releasing the one storage region.

14. A device for managing a redundant array of independent disks (RAID), comprising:
at least a processing unit;
at least one memory coupled to the at least one processing unit and storing instructions to be executed by the at least one processing unit, the instructions, when executed by the at least one processing unit, causing the device to perform actions comprising:
in response to receiving a first command for assigning a first RAID stripe to a RAID group, storing metadata information of the first RAID stripe in a cache, the cache having different input/output (I/O) performance from the RAID; and
storing the first command and the metadata information of the first RAID stripe in a predetermined storage space of the RAID in a sequential storage structure.

15. The device according to claim 14, wherein the cache comprises a first index array configured to store pointers for pointing to a plurality of data arrays and a plurality of data arrays configured to store metadata information of RAID stripes in the RAID group.

16. The device according to claim 15, wherein storing the metadata information of the first RAID stripe in the cache comprises:
in response to a first data array for storing the metadata information of the first RAID stripe being present in the cache, storing the metadata information of the first RAID stripe in the first data array; and
in response to the first data array being absent in the cache, creating the first data array in the cache and adding in the first index array a pointer for pointing to the first data array, and writing the metadata information of the first RAID stripe into the first data array.

17. The device according to claim 16, wherein the actions further comprise:
in response to the first index array being filled up, allocating a second index array in the cache, wherein a storage space of the second index array is larger than that of the first index array;
copying the pointers stored in the first index array into the second index array; and
releasing the first index array.

18. The device according to claim 15, wherein the actions further comprises:
in response to a second command for reading metadata information of a second RAID stripe in the RAID group, reading the metadata information of the second RAID stripe from a respective data array of the plurality of data arrays, wherein the second command comprises an index of the second RAID stripe.

19. The device according to claim 18, wherein reading the metadata information of the second RAID stripe from the respective data array of the plurality of data arrays comprises:
selecting a pointer pointing to a second data array from the first index array based on the index of the second RAID stripe, wherein the metadata information of the second RAID stripe is already stored in the second data array;
determining a storage location of the metadata information of the second RAID stripe in the second data array based on the index of the second RAID stripe and the pointer pointing to the second data array; and
reading the metadata information of the second RAID stripe from the second data array based on the storage location.

20. The device according to claim 15, wherein the actions further comprise:
in response to a third command for releasing a third RAID stripe from the RAID group, marking a storage location in a third data array configured to store metadata information of the third RAID stripe as a released state, wherein the metadata information of the third RAID stripe is already stored in the third data array.

21. The device according to claim 14, wherein the predetermined storage space comprises:
a data storage region configured to store metadata information of RAID stripes in the RAID group and commands associated with the metadata information of the RAID stripes; and
a first super section and a second super section, each configured to store head and tail addresses of a storage space already occupied in the data storage region, wherein one of the first super section and the second super section is marked as a currently active super section, and the other of the first super section and the second super section is marked as a to-be-updated super section.

22. The device according to claim 21, wherein the actions further comprise:
updating the head and tail addresses in the to-be-updated super section after storing the first command and the metadata information of the first RAID stripe in the predetermined storage space; and
marking the to-be-updated super-section as a new currently active super section, and marking the currently active super section as a new to-be-updated super section for next update.

23. The device according to claim 21, wherein the predetermined storage space further comprises a first intermediate section associated with the first super section and a second intermediate section associated with the second super section, and the first intermediate section and the second intermediate section are each configured to temporarily store information to be written into the data storage region.

24. The device according to claim 23, wherein storing the first command and the metadata information of the first RAID stripe in the predetermined storage space in the sequential storage structure comprises:
temporarily storing the first command and the metadata information of the first RAID stripe in an intermediate section of the first intermediate section and the second intermediate section corresponding to the to-be-updated super section; and
in response to the first intermediate section or the second intermediate section being filled up, writing information stored in the first intermediate section or the second intermediate section into the data storage region.

25. The device according to claim 21, wherein the actions further comprise:
in response to a third command for releasing a third RAID stripe from the RAID group, appending the third command into the data storage region.

26. The device according to claim 21, wherein the data storage region comprises a first data storage region and a second data storage region, and the actions further comprise:
in response to the occupied storage space in one storage region of the first storage region and the second storage region reaching a predetermined threshold, storing, in another storage region of the first storage region and the second storage region, the metadata information of the RAID stripes in the RAID group and the associated commands stored in the cache; and
releasing the one storage region.

27. A computer program product having a non-transitory computer readable medium which stores a set of instructions to manage a redundant array of independent disks (RAID); the set of instructions, when carried out by computerized circuitry, causing the computerized circuitry to perform a method of:
in response to receiving a first command for assigning a first RAID stripe to a RAID group, storing metadata information of the first RAID stripe in a cache, the cache having different input/output (I/O) performance from the RAID; and
storing the first command and the metadata information of the first RAID stripe in a predetermined storage space of the RAID in a sequential storage structure.

* * * * *